United States Patent [19]
Morgan

[11] 4,353,573
[45] Oct. 12, 1982

[54] KNEE ENGAGING SKI

[76] Inventor: Donald F. Morgan, 133 E. Central Ave., Zeeland, Mich. 49464

[21] Appl. No.: 178,799

[22] Filed: Aug. 18, 1980

[51] Int. Cl.³ .............................................. A63C 5/00
[52] U.S. Cl. .................................... 280/606; 280/809; 280/601; 280/12 R; 441/65
[58] Field of Search ................... 280/601, 12 B, 12 C, 280/12 K, 18, 27, 87.02 R, 809, 816, 607, 606; 9/310 R

[56] References Cited

U.S. PATENT DOCUMENTS

| | | | |
|---|---|---|---|
| 1,668,623 | 5/1928 | Avril | 280/87.02 R |
| 2,242,156 | 5/1941 | Wallace | 280/601 |
| 2,829,902 | 4/1958 | Stocker | 280/18 |
| 3,378,275 | 4/1968 | Rockwood et al. | 280/18 |
| 3,666,282 | 5/1972 | Buehing et al. | 280/18 |
| 3,689,092 | 9/1972 | Lake | 280/809 X |
| 4,028,761 | 6/1977 | Taylor | 280/18 X |
| 4,241,929 | 12/1980 | Curry | 280/18 X |

Primary Examiner—Joseph F. Peters, Jr.
Assistant Examiner—Michael Mar
Attorney, Agent, or Firm—Price, Heneveld, Huizenga & Cooper

[57] ABSTRACT

A type of recreational equipment which provides a pair of ski-like board members upon which the user kneels when in use. Each board member has a pocket to receive one of the user's knees and a plurality of stops to provide a purchase for the toes of the user's boots. Handheld pushers are provided to enable the user to propel himself.

8 Claims, 6 Drawing Figures

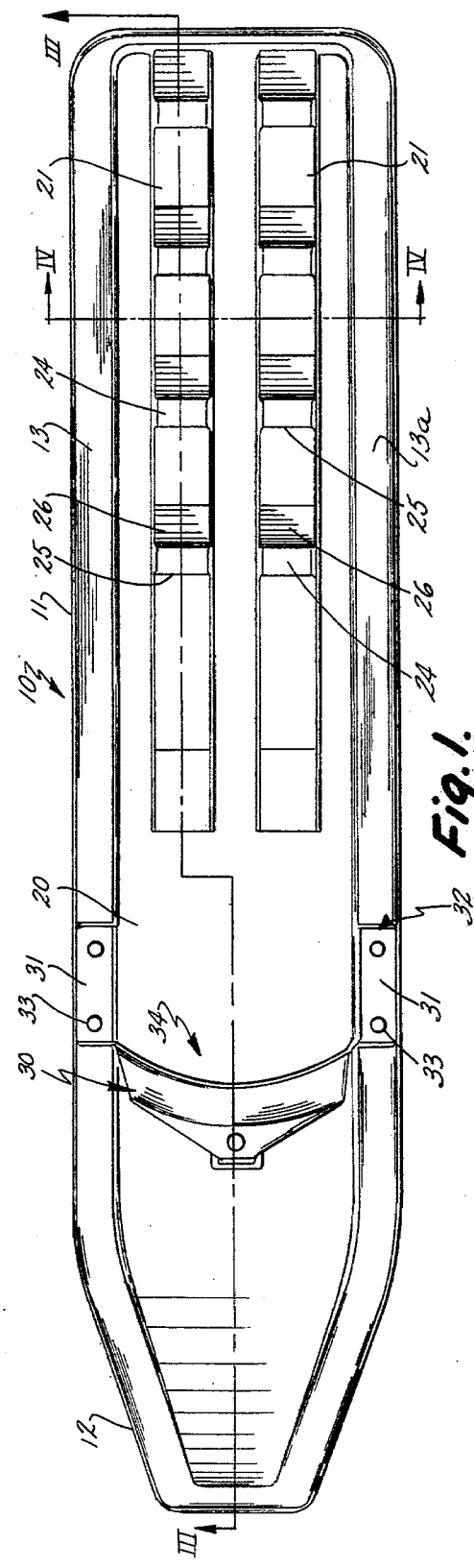
Fig. 1.
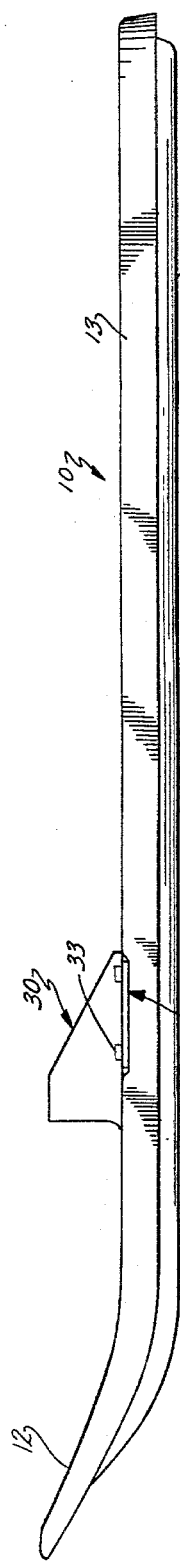
Fig. 2.
Fig. 3.

KNEE ENGAGING SKI

BACKGROUND OF THE INVENTION

This invention relates to sporting and recreational equipment and more particularly to equipment to enable a person to slide or skim over a surface in a kneeling position. It is particularly designed for use on snow. While it, to a limited extent, simulates the sport of skiing since it is designed for use by a person in a kneeling position, the procedures and techniques employed in its use are substantially different. cl BRIEF DESCRIPTION OF THE INVENTION The invention provides a pair of ski-like members on which the user kneels. Each of the members, adjacent its forward end, has a pocket into which the user inserts a knee. Toward the rearward end, each of the members has an upstanding stop against which the user braces the toe of his boot. Thus, by pressing the toes rearwardly, the user retains the members by pushing the knees against the pocket and the toes against the stop. With this type of grip on the members, the user can manuever through proper use of thigh muscles and shifting of body weight. In addition, the user is provided with a pair of hand-held paddle-like devices to push against the snow to propel himself over the surface and assist in changing the direction of travel.

BRIEF DESCRIPTION OF THE DRAWINGS

FIG. 1 is a plan view of one of the members;

FIG. 2 is a side elevation view of the ski-like member illustrated in FIG. 1;

FIG. 3 is a central, sectional view taken along the plane III—III of FIG. 1;

BRIEF DESCRIPTION OF THE PREFERRED EMBODIMENT

Figure 5:
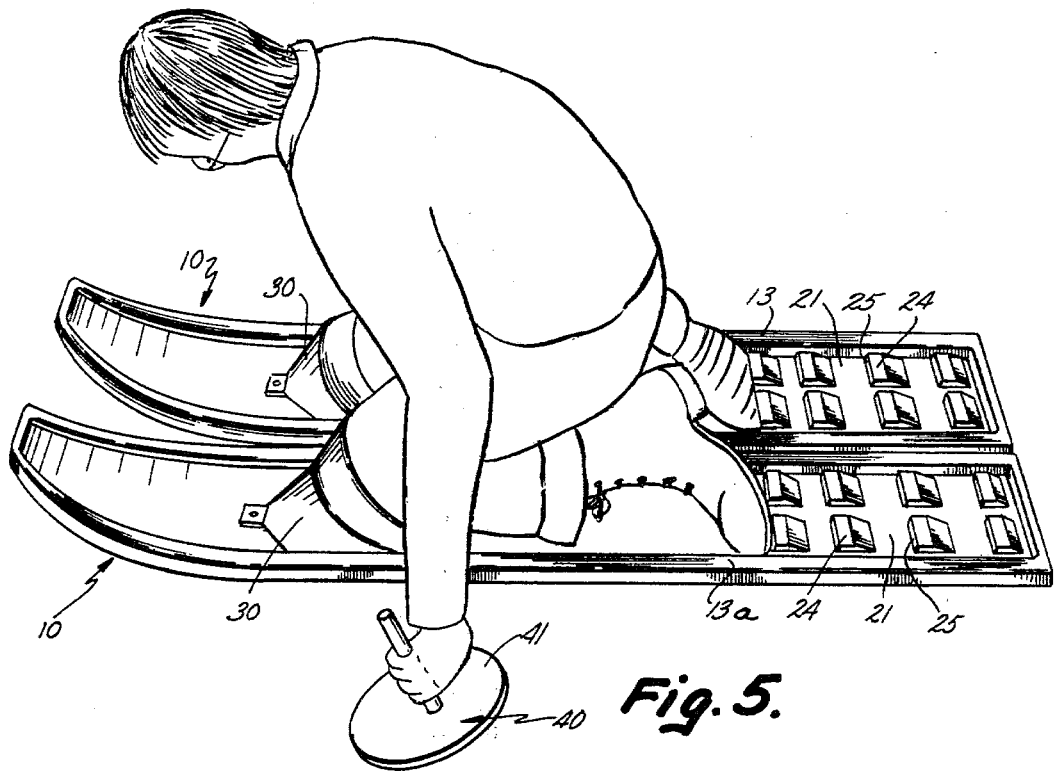
FIG. 5 is a perspective view of a person utilizing this invention.
Figure 4:
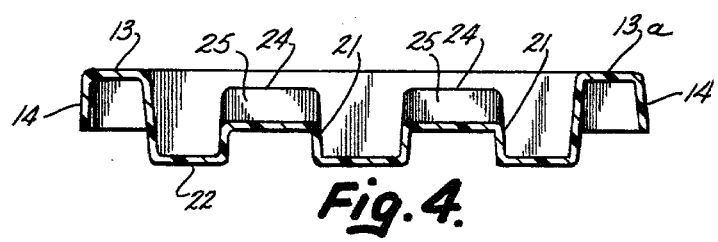
FIG. 4 is a transverse, sectional view taken along the plane IV—IV of FIG. 1.

The numeral 10 identifies a ski-like board member having an elongated body 11, the forward end 12 of which is curved upwardly. The body has a pair of side rails 13 each of which, along its outer edge, has a downwardly extending reinforcing flange 14 (FIG. 4). Integral with the side rails 13 and extending between them and the length of the body is a bottom panel 20. The bottom panel 20 in the forward portion of the body is flat except for the upward curvature at the forward end. The rearward portion of the panel 20 has a corrugated configuration forming upwardly extending ridges 21 and downwardly extending ribs 22 (FIGS. 1 and 4). The ribs and ridges are parallel and extend lengthwise of the body to the rearward end. The ridges 21 form downwardly facing elongated channels opening through the bottom face of the body with the ribs forming upwardly facing channels which separate the ridges. In the preferred embodiment there are two ridges. At its forward end each ridge 21 is phased out in a tapered slope into the flat forward portion of the bottom panel 20.

At spaced intervals lengthwise of the body, the ridges 21 have raised portions forming stops 24 with each stop having a vertical forward wall 25 and a rearwardly sloping rearward wall 26. The stops 24 are spaced apart lengthwise of the body with the number and spacing being such as to provide convenient toe stops for the user's boots with the spacing being such as to accommodate persons of various ages and heights. Each ridge has an indentical number of stops 24 which are parallel to each other transversely of the body.

Between the forward end of the ridges 21 and the upwardly curved front end of the body, a panel 30 is provided. The panel 30 spans the entire width of the body and at each end has an outwardly and rearwardly extending anchor flange 31. The anchor flanges each seat in a pocket 32 in the top surface of the side rails 13. The anchor flanges are secured to the rails 13 by any suitable means such as the fasteners 33. Between the flanges 31, the main body of the panel 30 is bowed or arched forwardly to provide a rearwardly opening, concave pocket 34. At the forward center of the panel, a forwardly extending lip 35 is provided which, at its center, is secured to the bottom panel of the body 20 by a suitable fastener 36. The fastener is mounted in a small recess 38 in the lower face of the panel 20.

In a preferred embodiment, the entire body of the member 10 is formed as a single, unitary unit from suitable plastic material. It can be injection molded or vacuum formed in a suitable die from a material such as polypropylene or it can be formed as a lay up over a suitably shaped mold. In this latter case, it can be reinforced such as by fiberglass in a plastic matrix of polyolefin or polyester. The knee panel 30 can be similarly molded of a suitable plastic such as polypropylene or a polyvinyl chloride. It is preferable that the knee panel 30 have at least a small degree of flexibility to permit limited shape adjustment to that of the user's knee.

In use, a pair of the ski-like board members 10 are used, one for each leg. The ribs and the channels formed by the ridges between the ribs act as directional stabilizers preventing the board members from sliding sideways and aiding the user in maintaining straight forward movement. When the board members are not being used on a downward slope, paddle-like propulsion members or pushers 40 are provided. These can take a number of forms but should have an enlarged end piece 41 with a broad bottom surface suitable for pushing against the snow. The end piece has short, upstanding handles 42 to provide a grip for the user. A short handle is all that is necessary since the user is in a kneeling position.

It will be seen that the invention provides a new and different type of ski-like board means for skimming over a surface. Because the user will be in kneeling position and will use his knees rather than his ankles and lower legs as a primary guiding means, the techniques for the utilization of this invention will differ markedly from either snow or water skis of the conventional type. The primary guidance will be done by the thigh muscles and shifting of body weight.

While the invention has been disclosed and described as primarily for use on snow, it will be recognized that this invention could be applied to use on water. In this case, the panels 30 are preferably located further back on the ski so that the center of the user's weight will be closer to the rear. This will permit the forward ends of the board members to be tipped up for water use. Also, the board members would then be manufactured using processes and materials which will make them light enough to float. This could be done by manufacturing them of a self-skinning rigid foam to reduce the density yet provide adequate structural strength to withstand the forces which will be imposed upon them during use.

Figure 6:
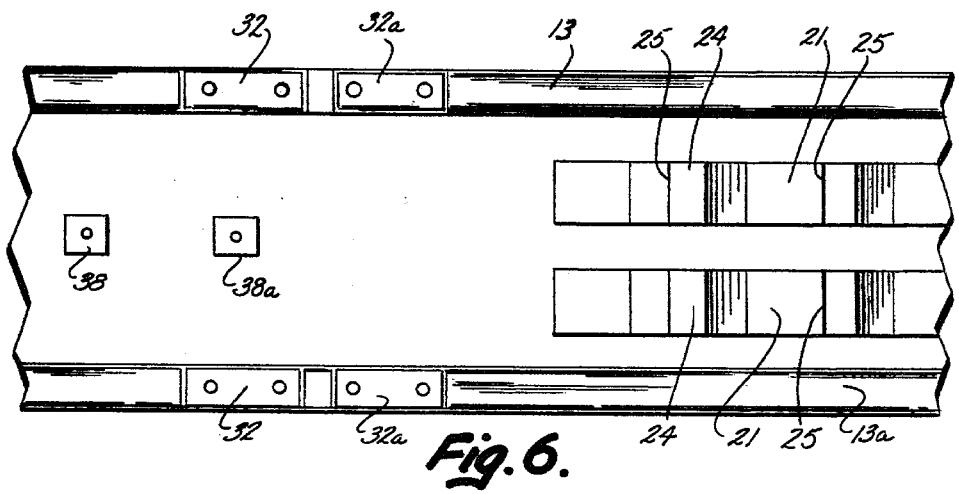
FIG. 6 is a fragmentary plan view of a modified form of the invention.

A modification of the invention could include providing a second pair of pockets 32a in the side rails 13a with the second pair being rearwardly of the first pair 32 to permit the panel 30 to be shifted lengthwise to adapt the same board members to either use. At the same time a second recess 38a is provided for the center anchor for the panel. To facilitate panel relocation the fasteners 33 are of the detachable type such as bolts. This arrangement is illustrated in FIG. 6. In this case, the forward ends of the ridges 21 may be shifted a short distance to the rear to avoid interference with the user's knees when the panel 30 is in the rear position. This would not require any change in the number or position of the stops 24.

Having described the preferred embodiment of the invention and a modification thereof, it will be recognized that various modifications can be made of the invention without departing from the principles thereof. Such modifications are to be considered as included in the hereinafter appended claims unless these claims by their language expressly state otherwise.

The embodiments of the invention in which an exclusive property or privilege is claimed are defined as follows:

1. A ski-like board member for slidably supporting a person in kneeling position for movement over a low friction surface, said device having an elongated body formed as an integral single unitary piece with an upwardly curved forward end, an upstanding, rearwardly inclined, transverse panel defining a rearwardly facing pocket of a size and shape to receive a person's knee, said pocket being forwardly bowed and adjacent to and rearward of said curved forward end; an upstanding stop integrally formed with said body and having a forwardly facing substantially vertical wall for engaging the toe of a person's boot, said stop being spaced from said pocket and adjacent the rearward end of said body.

2. The ski-like board member described in claim 1 further characterized in that a plurality of said stops are provided arranged in pairs with the stops of each pair spaced laterally of said body, said pairs of stops being spaced apart lengthwise of said body.

3. The ski-like board member described in either claims 1 or 2 further characterized in that the bottom surface of the rearward portion of said body has a plurality of elongated depending ribs and downwardly opening channels, said channels being laterally positioned between said ribs and portions of the tops thereof forming said stops; said ribs being on each side of and between said channels.

4. The ski-like board member described in claim 2 further characterized in that the rearward portion of said body is transversely corrugated to form elongated rearwardly extending ridges and channels, the tops of the corrugations which form downwardly opening channels in the lower face of said body having upwardly extending portions forming said stops; said forwardly facing walls of said stops being vertical and the rearward walls thereof being inclined downwardly and rearwardly.

5. The ski-like board member described in claim 1 further characterized in that said body is formed from plastic; first means for securing said panel at its center to said body and second means are provided to secure the lateral ends of said panel to the sides of said body.

6. A ski-like board member for slidably supporting a person in kneeling position for movement over a low friction surface, said device having an elongated body with an upwardly curved forward end, an upstanding transverse panel defining a rearwardly facing pocket of a size and shape to receive a person's knee, said pocket being adjacent to and rearward of said curved forward end; a plurality of stops each having a forwardly facing wall for engaging the toe of a person's boot, said stops being spaced apart lengthwise of said body and from said pocket; the rearward portion of said body being transversely corrugated to form elongated rearwardly extending ridges and channels, the tops of the corrugations which form downwardly opening channels in the lower face of said body having upwardly extending portions forming said stops, said forwardly facing walls of said stops being vertical and the rearward walls thereof being inclined downwardly and rearwardly.

7. A ski-like board member for slidably supporting a person in kneeling position for movement over a low friction surface, said device having an elongated body with an upwardly curved forward end, an upstanding transverse panel defining a rearwardly facing pocket of a size and shape to receive a person's knee, said pocket being adjacent to and rearward of said curved forward end; a stop having a forwardly facing wall for engaging the toe of a person's boot, said stop being spaced from said pocket and adjacent the rearward end of said body; said body having a raised rail along each side; anchor members integral with each side of said panel which seat on said rails, a first pair of recesses in said side rails, one to seat each of said anchor members, a second pair of recesses in said side rails spaced from said first pair lengthwise of said body to permit said panel to be alternatively positioned lengthwise thereof to adapt said board members to use with different surface mediums; detachable fasteners for securing said anchor members to said rails.

8. The means described in claim 7 further characterized in that a pair of surface contacting propulsion members are provided, one for each hand whereby the person can create forward motion by pushing the same against the surface over which the ski-like board member is to be moved, each of said propulsion members having an enlarged bottom face and an upstanding handle of a length only sufficient to provide a grip for the user.

* * * * *